(12) United States Patent
Yih

(10) Patent No.: US 6,517,096 B2
(45) Date of Patent: Feb. 11, 2003

(54) SHOCK ABSORBING DEVICE USED IN A BICYCLE TO REDUCE SHOCK TRANSMITTED TO A HANDLEBAR

(75) Inventor: Johnson Yih, Hsien (TW)

(73) Assignee: Giant Manufacturing Co., Ltd., Taichung Hsien (TW)

(*) Notice: Subject to any disclaimer, the term of this patent is extended or adjusted under 35 U.S.C. 154(b) by 17 days.

(21) Appl. No.: 09/748,561

(22) Filed: Dec. 22, 2000

(65) Prior Publication Data

US 2002/0079670 A1 Jun. 27, 2002

(51) Int. Cl.[7] ............................................. B62K 25/04
(52) U.S. Cl. ..................... 280/283; 280/276; 280/277
(58) Field of Search ................................ 280/276, 277, 280/283

(56) References Cited

U.S. PATENT DOCUMENTS

| 4,997,197 | A | * | 3/1991 | Shultz | 280/275 |
| 5,299,820 | A | * | 4/1994 | Lawwill | 280/277 |
| 5,899,478 | A | * | 5/1999 | Woodside | 280/276 |
| 5,931,487 | A | * | 8/1999 | Koppelberg | 280/276 |
| 6,036,211 | A | * | 3/2000 | Nohr | 280/276 |
| 6,047,981 | A |   | 4/2000 | Burrows | 280/276 |

FOREIGN PATENT DOCUMENTS

| BE | 377911 | 7/1931 |
| DE | 89 06 328 | 1/1990 |
| DE | 94 03 640 | 11/1994 |
| DE | 94 14 705 | 6/1995 |
| EP | 0 726 198 A2 | 8/1996 |
| WO | WO 00/13961 | 3/2000 |

* cited by examiner

Primary Examiner—Paul N. Dickson
Assistant Examiner—L. Lum
(74) Attorney, Agent, or Firm—Harness, Dickey & Pierce, P.L.C.

(57) ABSTRACT

A shock absorbing device is mounted between a stem and a front wheel axle of a bicycle to reduce shock that is transmitted to a handlebar, and includes a support leg disposed to swivel with the stem, a lever with a proximate end anchored relative to the axle and a distal end fitted to the support leg, a crank member with a journalled end journalled on the axle and a web portion coupling with one of the proximate end and the intermediate portion of the support leg and terminating at a coupling end. A friction brake member is disposed on the web portion and is movable to abut against another brake member mounted on a front hub of the bicycle as a result of a braking action, while taking up the inertial momentum of the front hub to turn the web portion as well as the coupling end so as to move one of the proximate end and the intermediate portion away from the other one of the intermediate portion and the proximate end, thereby counteracting the relative movement of the intermediate portion towards the proximate end stemming from the braking action.

6 Claims, 8 Drawing Sheets

SHOCK ABSORBING DEVICE USED IN A BICYCLE TO REDUCE SHOCK TRANSMITTED TO A HANDLEBAR

BACKGROUND OF THE INVENTION

1. Field of the Invention

This invention relates to a shock absorbing device for use in a bicycle, more particularly to a shock absorbing device which is mounted between a handlebar and a front wheel axle to reduce shock transmitted from the front wheel axle to the handlebar.

2. Description of the Related Art

To lessen the shock as a result of unevenness of the road surface and transmitted to a handlebar of a bicycle, the conventional bicycle is generally provided with a shock absorbing device. The shock absorbing device includes upper and lower tubular portions which are telescoped to each other, and a resisting member which is disposed between the upper and lower tubular portions to provide a damping action for the shock. However, when the handlebar is abruptly pressed by the combined inertial momenta of the mass of the rider and the mass of the bicycle as a result of a braking action, the upper tubular portion will be moved abruptly downwardly and forwardly, thereby exposing the rider to danger.

SUMMARY OF THE INVENTION

The object of the present invention is to provide a shock absorbing device which can counteract the downward and forward movement of the handlebar stemming from a braking action for enhancing safety and comfort.

According to this invention, the shock absorbing device includes a support leg which has an upper end adapted to be swiveled with a first coupling end of a stem of a bicycle about a swiveling axis and to be disposed distal to a handlebar, and an intermediate portion extending from the upper end downwards and forwardly and terminating at a lower end above a front wheel axle of the bicycle. A lever includes a proximate end to be anchored relative to the front wheel axle, and a distal end fitted to the lower end of the support leg such that the intermediate portion is movable towards the proximate end when the stem is abruptly pressed by the combined inertial momenta of the mass of a rider and the mass of the bicycle as a result of a braking action, or when shock is transmitted upwards via the front wheel axle as a result of unevenness of a road surface being traversed by the bicycle. A crank member includes a journal end to be journalled on the front wheel axle, and a web portion extending from the journal end radially and terminating at a coupling end which is disposed to couple with one of the proximate end and the intermediate portion. A resisting member is disposed to bias the intermediate portion to move away from the proximate end, thereby providing a damping action to a shock. A second friction brake member is disposed on and is movable relative to the web portion axially between a braked position, where the second friction brake member, in response to an actuation of a front brake cable of the bicycle, is moved to abut against a first friction brake member which is disposed on a front hub, so as to generate a frictional force to retard running of the front hub, while taking up the inertial momentum of the front hub to push the web portion as well as the coupling end to turn so as to move a corresponding one of the proximate end and the intermediate portion away from the other one of the intermediate portion and the proximate end, thereby counteracting the relative movement of the intermediate portion towards the proximate end stemming from the braking action, and an unbraked position, where the second friction brake member is moved outwardly and axially to disengage the first friction brake member.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
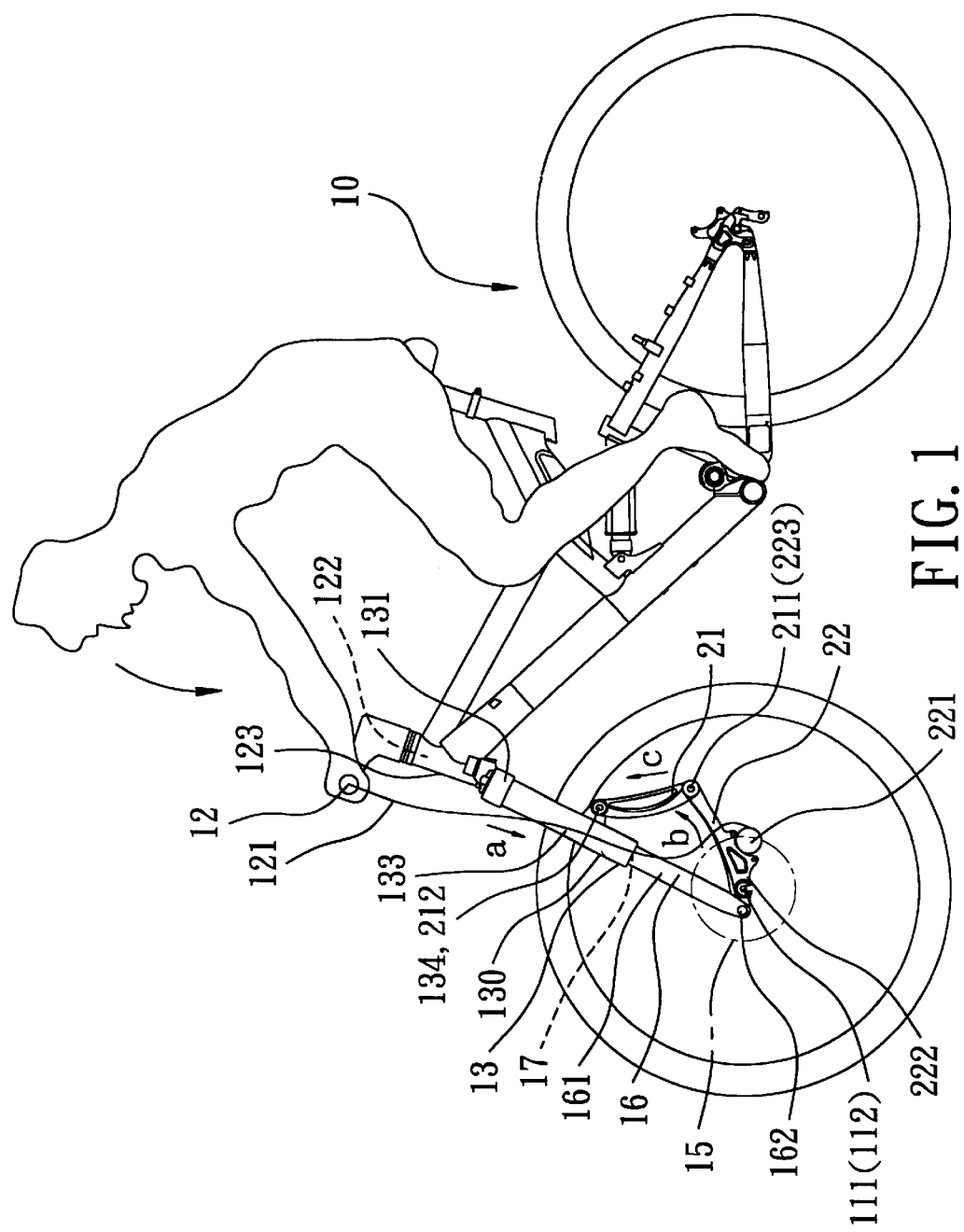
FIG. 1 is a schematic side view of a first preferred embodiment of a shock absorbing device according to this invention when incorporated in a bicycle.

Before the present invention is described in greater detail, it should be noted that same reference numerals have been used to denote like elements throughout the specification.

Figure 2:
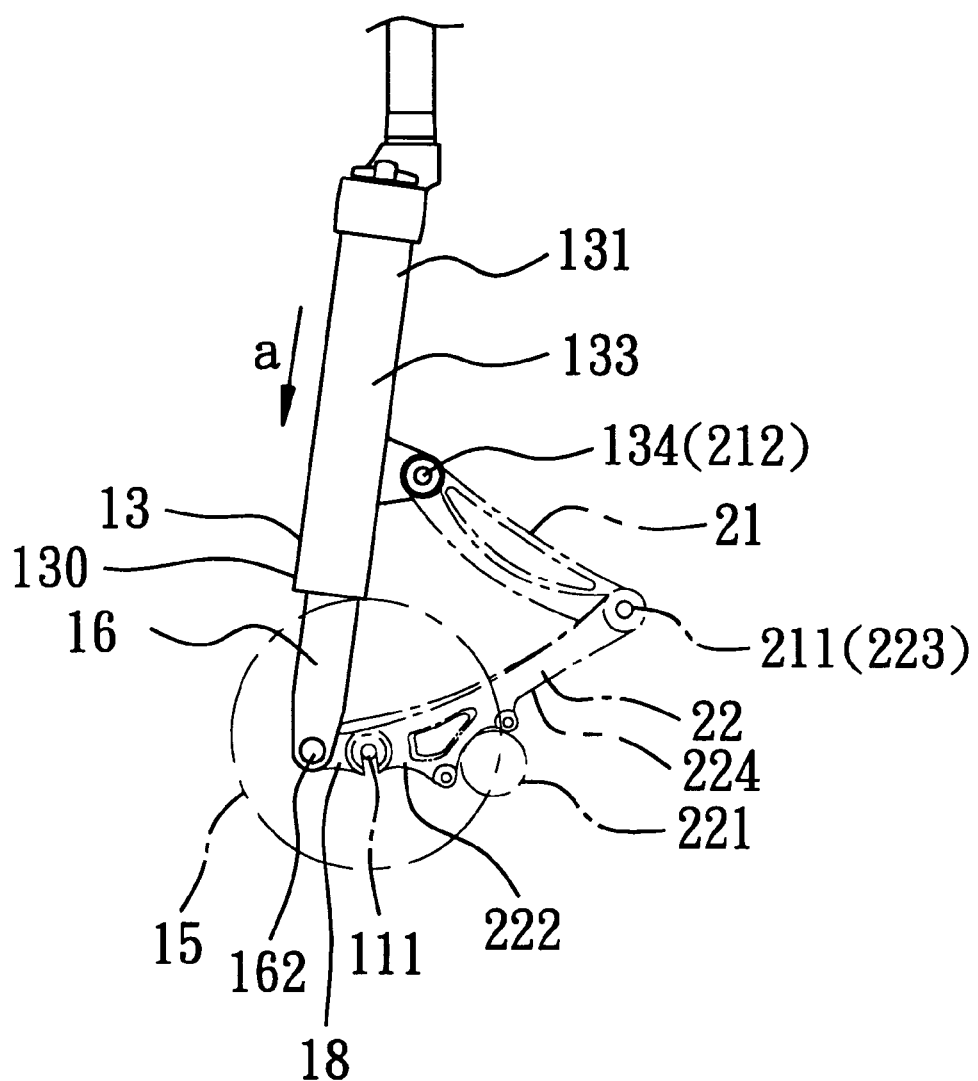
FIG. 2 is a schematic side view of the first preferred embodiment when a support leg is pressed by shock as a result of a braking action.

Referring to FIGS. 1 and 2, the first preferred embodiment of the shock absorbing device according to the present invention is shown to be mounted between a handlebar 12 and a front wheel axle 111 of a bicycle 10. The bicycle 10 includes a front brake cable 121, the front wheel axle 111 which defines a rotating axis, a front hub 112 which is mounted on the front wheel axle 111 to rotate about the rotating axis, a first friction brake member 15, such as a brake disc, which is mounted to rotate with the front hub 112, and which includes an outer circumferential wall surface surrounding the rotating axis, and a stem 122 which is received in a head tube 123, and which is disposed on and which extends from the handlebar 12 downwards to terminate at a first coupling end that is swiveled about a swiveling axis. When the bicycle 10 is in use, shock is transmitted along a route which extends radially from the front wheel axle 111 and rearwardly and upwardly to the swiveling axis of the stem 122 to the handlebar 12.

Accordingly, the shock absorbing device of this embodiment includes a support leg 13, a lever 16, a crank member 22, a second friction brake member 221, and a resisting member 17.

The support leg 13 includes an upper end 131 which is adapted to be swiveled with the first coupling end of the stem 122 about the swiveling axis and to be disposed distal to the handlebar 12, and an intermediate portion 133 which extends from the upper end 131 downwards and forwardly and which terminates at a lower end 130 that is adapted to be disposed above the front wheel axle 111.

The lever 16 includes a distal end 161 which is telescopically fitted to the lower end 130 of the support leg 13, and a proximate end 162 which is connected to a first linking end of a second coupler 18. The second coupler 18 further has a second journalled end which is journalled on the front wheel axle 111. Thus, when the stem 122 is abruptly pressed by the combined inertial momenta of the mass of a rider and the mass of the bicycle as a result of a braking action, or when the shock is transmitted upwards via the front wheel axle 111 as a result of unevenness of a road surface being traversed by the bicycle 10, the intermediate portion 133 of the support leg 13 is movable towards the proximate end 162 of the lever 16, as indicated by arrow (a) in FIG. 2. Moreover, the resisting member 17 includes a coil spring (not shown) which is interposed between the lower end 130 of the support leg 13 and the distal end 161 of the lever 16 to bias the intermediate portion 133 to move away from the proximate end 162, thereby providing a damping action to the shock.

The crank member 22 includes a first journal end 222 which is journalled on the front wheel axle 111, and a web portion 224 which extends from the first journal end 222 radially relative to the rotating axis and which terminates at a second coupling end 223 that is connected to one end 211 of a first coupler 21. The other end 212 of the first coupler 21 is connected to a lug 134 which is disposed on the intermediate portion 133 of the support leg 13. Moreover, the second coupler 18 is disposed to be turned with the web portion 224 of the crank member 22.

Figure 3:
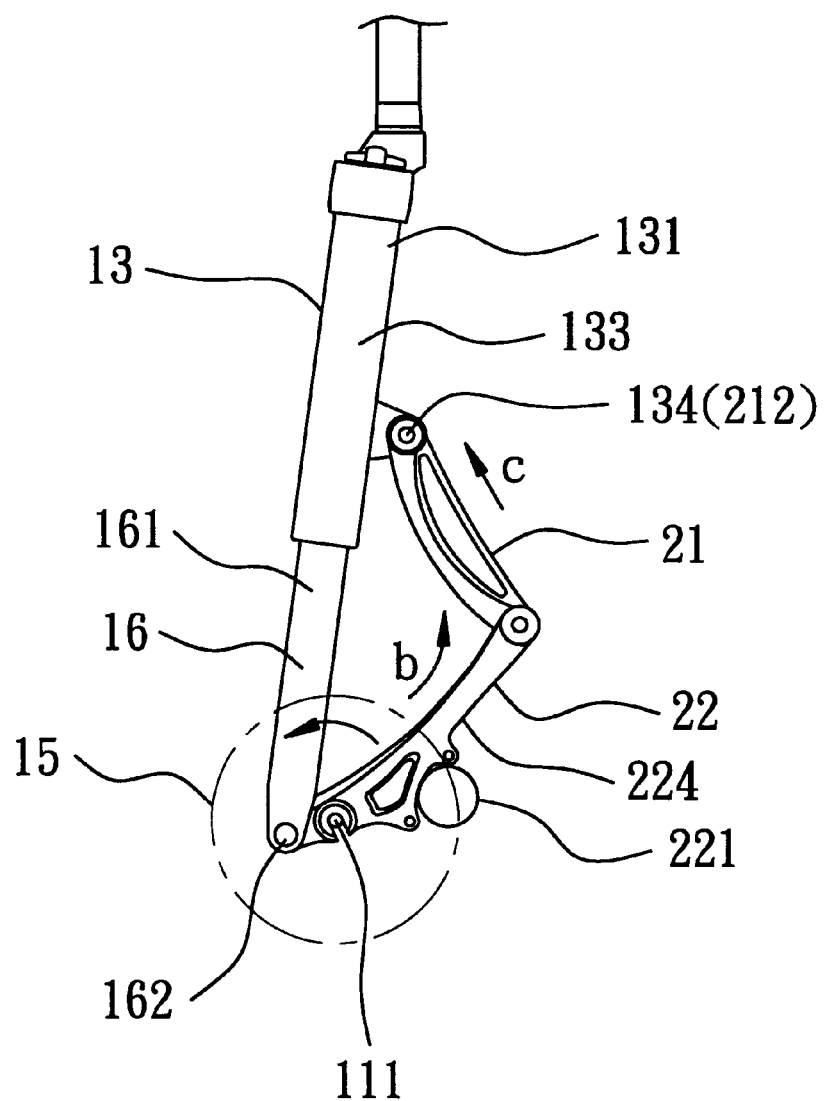
FIG. 3 is a schematic view of the first preferred embodiment when counteracting the shock.

The second friction brake member 221 is disposed on and is movable relative to the web portion 224 in an axial direction parallel to the rotating axis and between a braked position and an unbraked position. In the braked position, as shown in FIG. 3, the second friction brake member 221, in response to an actuation of the front brake cable 121, is moved to abut against the first friction brake member 15 so as to generate a frictional force to retard running of the front hub 112, while taking up the inertial momentum of the front hub 112 to push the web portion 224 as well as the second coupling end 223 and the first coupler 21 to turn in the directions as indicated by arrows (b), (c) in FIGS. 1 and 3 so as to move the intermediate portion 133 away from the proximate end 162, thereby counteracting the relative movement of the intermediate portion 133 towards the proximate end 162 that stems from the braking action. In the unbraked position, the second friction brake member 221 is moved outwardly and in the axial direction to disengage the first friction brake member 15.

Figure 4:
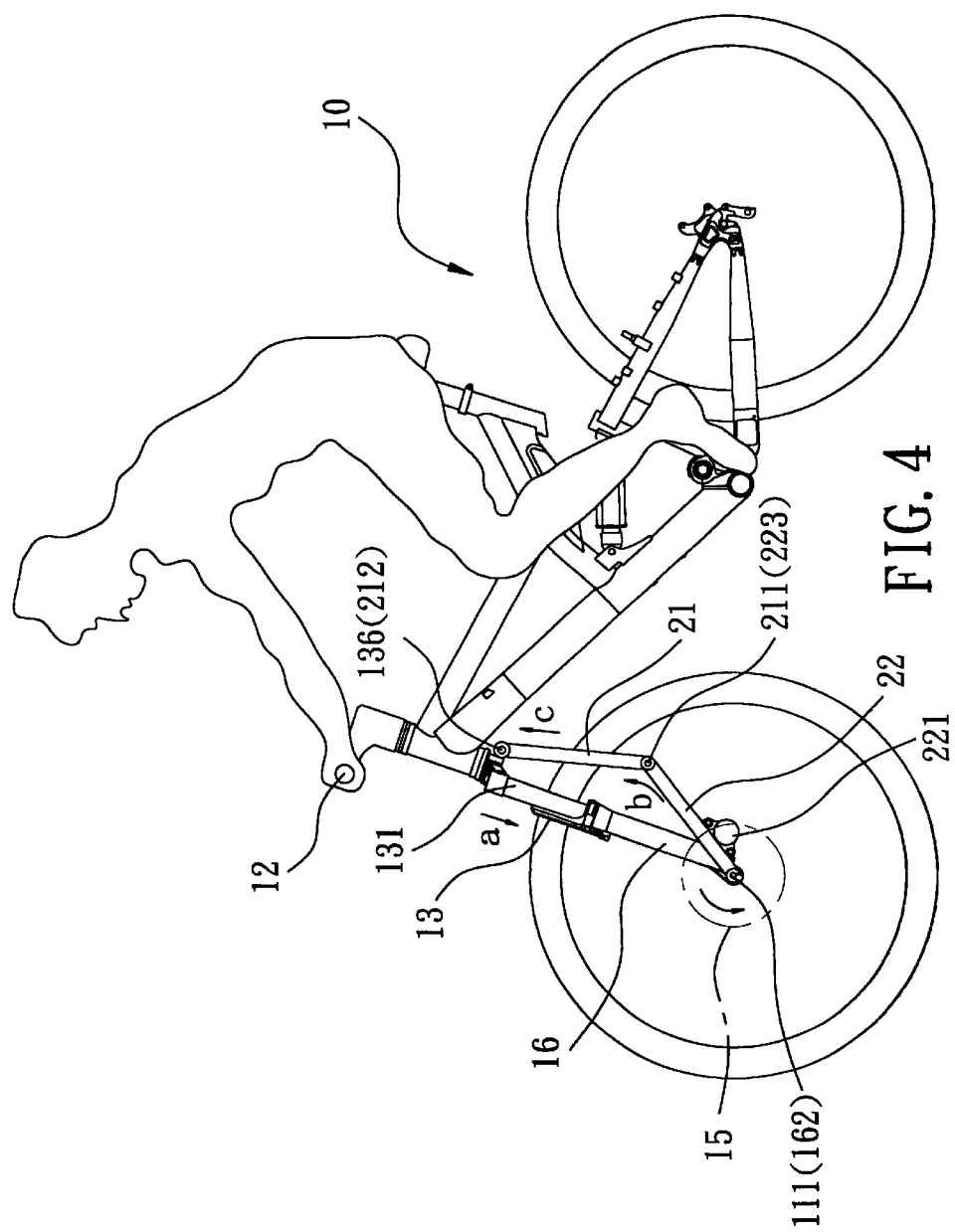
FIG. 4 is a schematic side view of a second preferred embodiment of the shock absorbing device according to this invention when incorporated in a bicycle.
Figure 5:
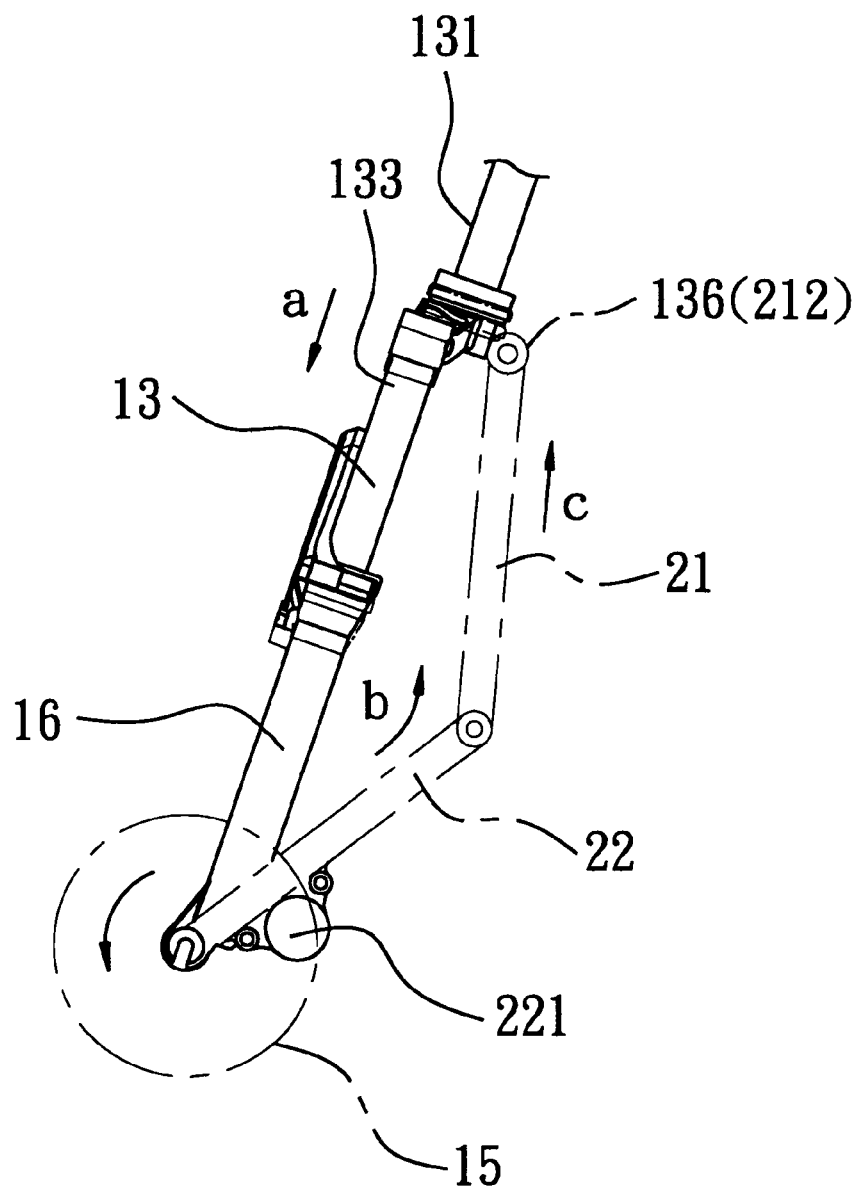
FIG. 5 is a schematic side view of the second preferred embodiment when a support leg is pressed by shock as a result of a braking action.
Figure 6:
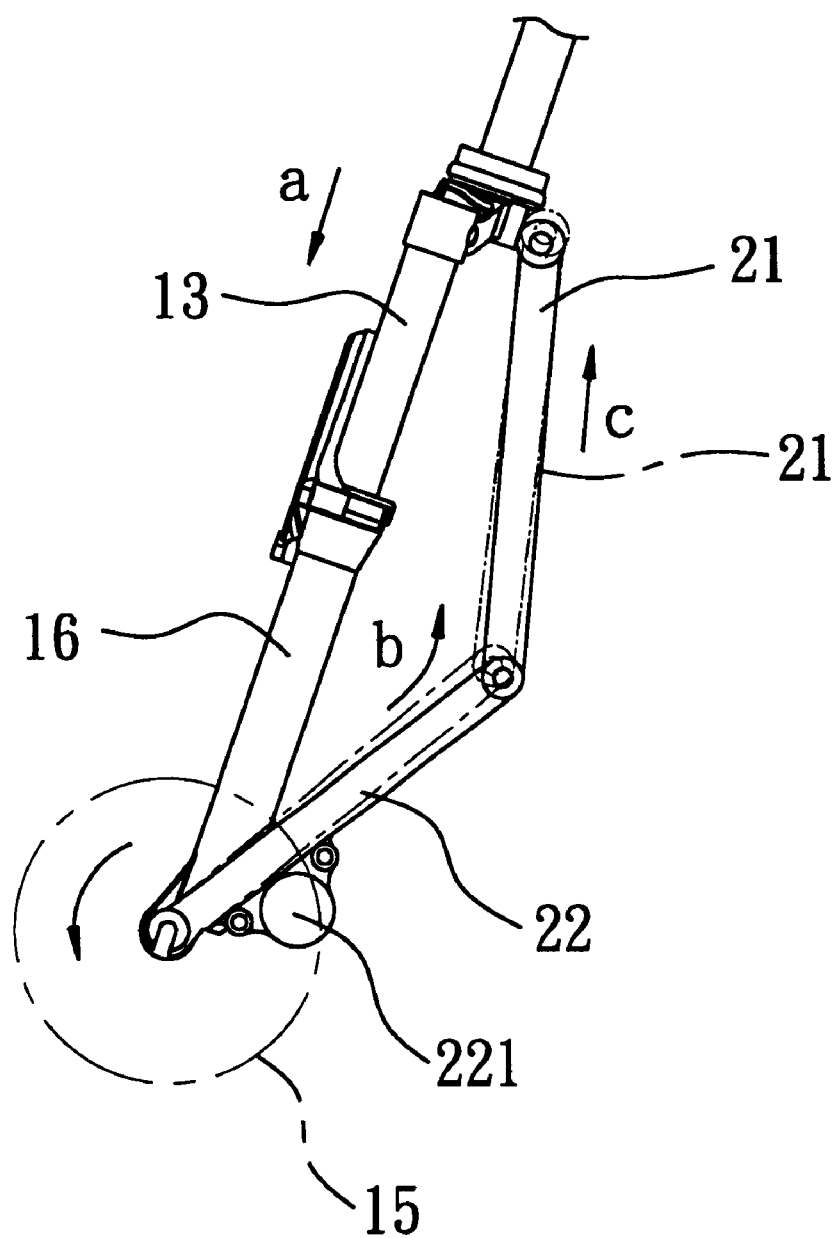
FIG. 6 is a schematic view of the second preferred embodiment when counteracting the shock.

As shown in FIGS. 4, 5 and 6, the second preferred embodiment of the shock absorbing device is similar to the first preferred embodiment in both construction and operation. The difference resides in that the proximate end 162 of the lever 16 is journalled on the front wheel axle 111 without provision of the second coupler. In addition, the end 212 of the first coupler 21 is connected to a lug 136 which is disposed on the intermediate portion 133 of the support leg 13 proximate to the upper end 131.

Figure 7:
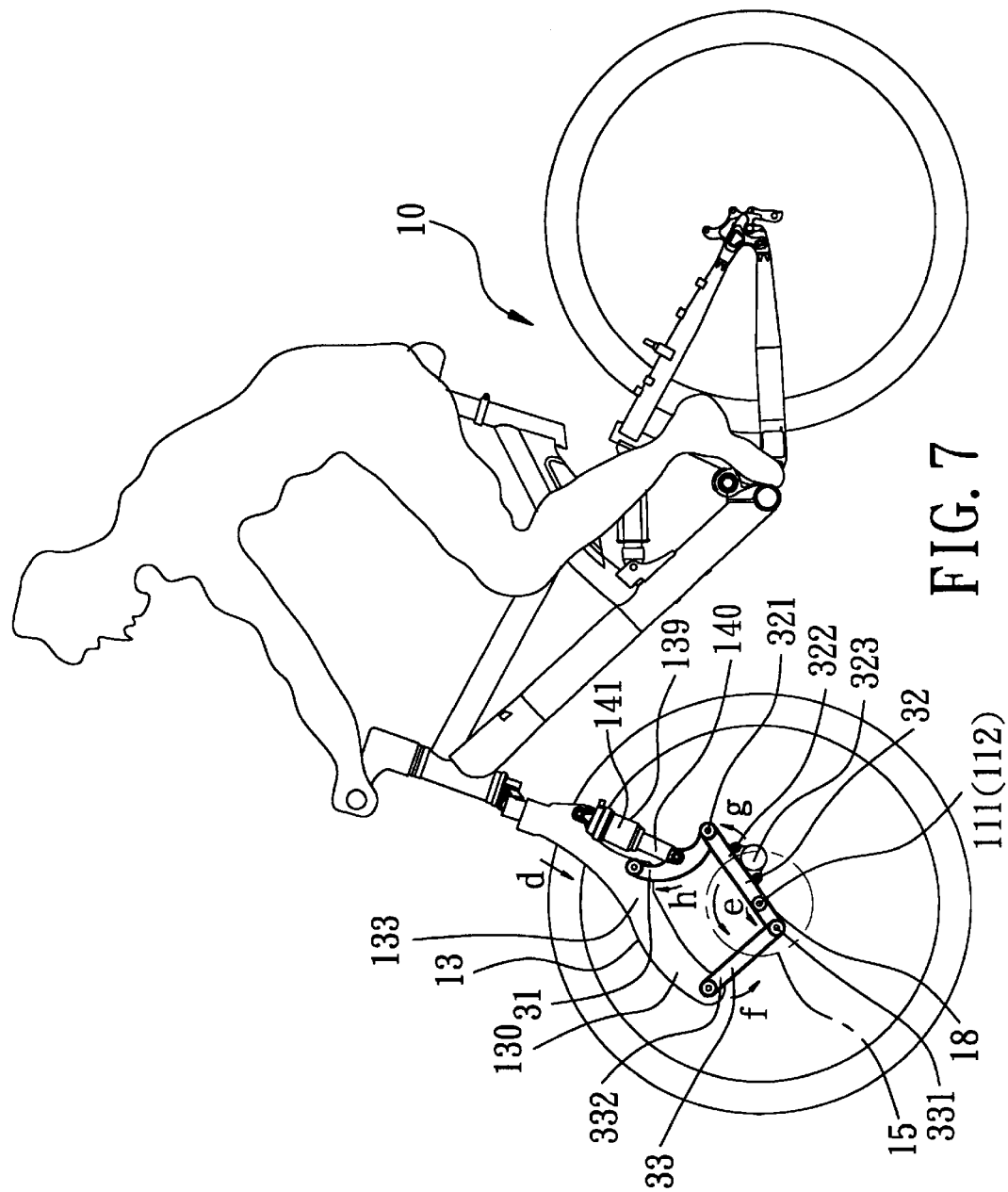
FIG. 7 is a schematic side view of a third preferred embodiment of the shock absorbing device according to this invention when incorporated in a bicycle.

The third preferred embodiment of this invention is shown in FIG. 7. The shock absorbing device includes a support leg 13 in the form of a two-pronged fork, a lever 33 which has a distal end 332 that is connected to a lower end 130 of the support leg 13, a crank member 32, a first coupler 31 which interconnects the intermediate portion 133 of the support leg 13 and the second coupling end 321 of the crank member 32, and a second coupler 18 which is connected to the proximate end 331 of the lever 33 at one end and which is journalled on the front wheel axle 111 at the other end to be turned with the crank member 32. A resisting member includes a telescopic portion 139 which has loaded and support ends 141,140 opposite to each other, and a coiled spring (not shown) which is disposed in the telescopic portion 139 to bias the loaded end 141 away from the support end 140 for providing a shock damping action. The loaded and support ends 141,140 are connected respectively to the intermediate portion 133 and the first coupler 31.

During a braking operation, the second friction brake member 323, which is disposed on the crank member 32, is moved to abut against the first friction brake member 15, while taking up the inertial momentum of the front hub 112 to push the web portion 322 to turn in a direction as indicated by the arrow (e). Then, the lever 33, the second coupling end 321, and the first coupler 31 are actuated to turn in the directions as indicated by arrows (f), (g), (h) so as to move the intermediate portion 133 away from the proximate end 331, thereby counteracting the relative movement of the intermediate portion 133 towards the proximate end 331 that stems from the braking action as indicated by the arrow (d).

Figure 8:
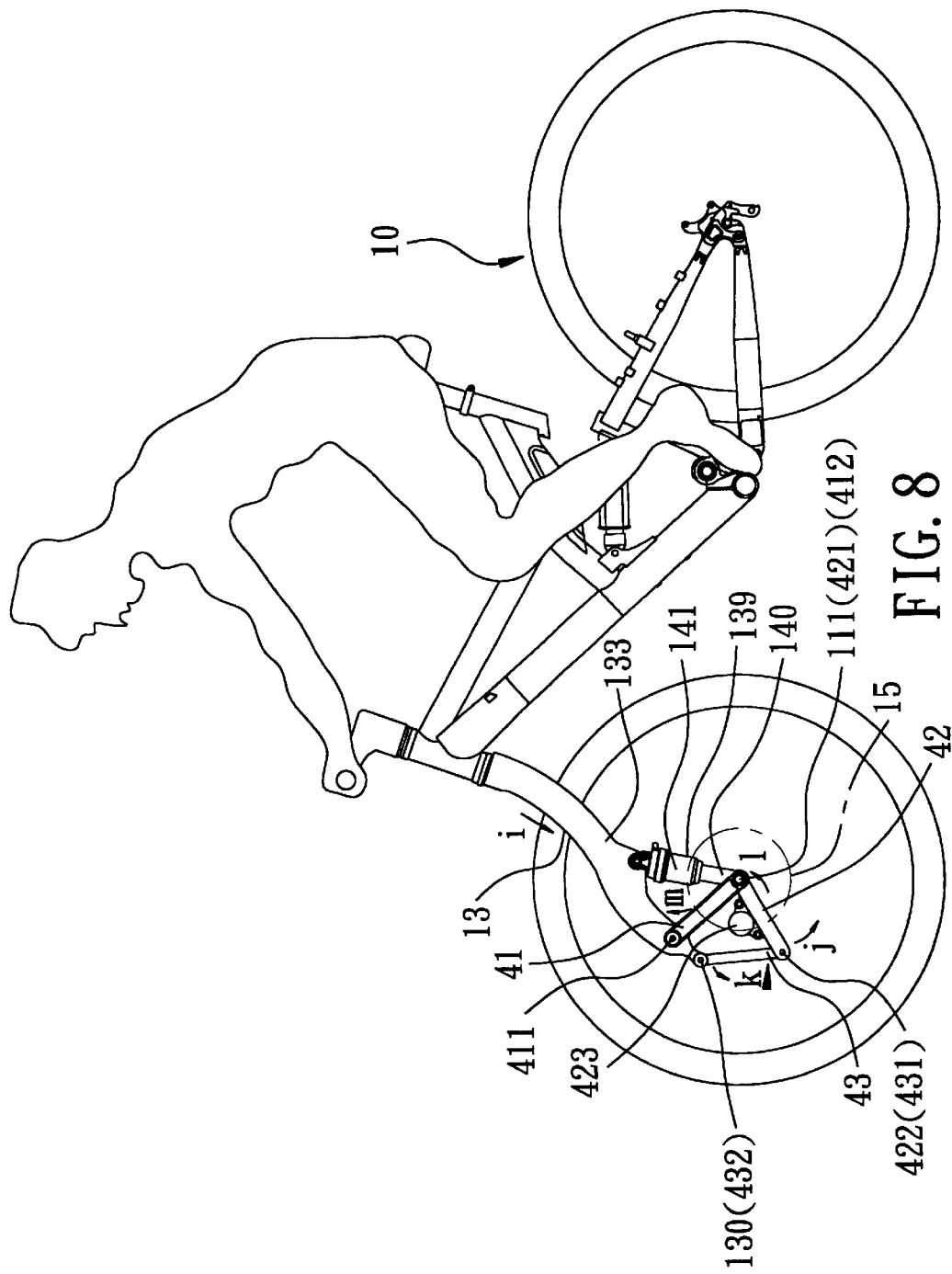
FIG. 8 is a schematic side view of a fourth preferred embodiment of the shock absorbing device according to this invention when incorporated in a bicycle.

As shown in FIG. 8, the fourth preferred embodiment of the shock absorbing device of this invention includes a support leg 13 in the form of a two-pronged fork, a lever 43 which has a distal end 432 that is connected to the lower end 130 of the support leg 13, and a crank member 42 which has a second coupling end 422 that is connected to a proximate end 431 of the lever 43, and a first journalled end 421 that is journalled on the front wheel axle 111. A resisting member includes a telescopic portion 139 which has loaded and support ends 141,140 opposite to each other, and a coiled spring (not shown) which is disposed in the telescopic portion 139. The loaded end 141 is connected to the intermediate portion 133 of the support leg 13, and the support end 140 is connected to the front wheel axle 111. A third coupler 41 has a third journal end 412 which is journalled on the front wheel axle 111, and a second linking end 411 which is connected to the intermediate portion 133 proximate to the lower end 130.

When the second friction brake member 423 is moved to abut against the first friction brake member 15 during the braking operation, the inertial momentum of the front hub can push the second coupling end 422 of the crank member 42 to turn in a direction as indicated by the arrow (j). Then, the lever 43, the first journalled end 421, and the third coupler 41 are actuated to turn in the directions as indicated by arrows (k), (1), (m) so as to move the loaded end 141 away from the support end 140 and to move the intermediate portion 133 away from the proximate end 431, thereby counteracting the relative movement of the intermediate portion 133 towards the proximate end 431 that stems from the braking action as indicated by the arrow (i).

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A shock absorbing device adapted for use in a bicycle to reduce shock transmitted to a handlebar of the bicycle, the bicycle including a front brake cable, a front wheel axle defining a rotating axis, a front hub mounted on the front wheel axle to rotate about the rotating axis, a first friction brake member mounted to rotate with the front hub, and including an outer circumferential wall surface surrounding the rotating axis, and a stem disposed on and extending from the handlebar downwards to terminate at a first coupling end which is swiveled about a swiveling axis, wherein the shock is transmitted along a route which extends radially from the front wheel axle and rearwardly and upwardly to the swiveling axis of the stem to the handlebar, said shock absorbing device comprising:

a support leg including an upper end adapted to be swiveled with the first coupling end of the stem about the swiveling axis and to be disposed distal to the handlebar, and an intermediate portion extending from said upper end downwards and forwardly and terminating at a lower end which is adapted to be disposed above the front wheel axle;

a lever including a proximate end adapted to be anchored relative to the front wheel axle, and a distal end fitted to said lower end of said support leg such that said intermediate portion is movable towards said proximate end when the stem is abruptly pressed by the combined inertial momenta of the mass of a rider and the mass of the bicycle as a result of a braking action, or when the shock is transmitted upwards via the front wheel axle as a result of unevenness of a road surface being traversed by the bicycle;

a crank member including a first journal end adapted to be journalled on the front wheel axle, and a web portion extending from said first journal end radially relative to the rotating axis and terminating at a second coupling end which is disposed to couple with said intermediate portion;

a resisting member disposed to bias said intermediate portion to move away from said proximate end, thereby providing a damping action to the shock;

a second friction brake member disposed on and movable relative to said web portion in an axial direction parallel to the rotating axis and between a braked position, where said second friction brake member, in response to an actuation of the front brake cable, is moved to abut against the first friction brake member so as to generate a frictional force to retard running of the front hub, while taking up the inertial momentum of the front hub to push said web portion as well as said second coupling end to turn so as to move a corresponding one of said proximate end and said intermediate portion away from the other one of said intermediate portion and said proximate end, thereby counteracting the relative movement of said intermediate portion towards said proximate end stemming from the braking action, and an unbraked position, where said second friction brake member is moved outwardly and in the axial direction to disengage the first friction brake member;

a first coupler interconnecting said second coupling end and said intermediate portion; and a second coupler having a journal end which is adapted to be journalled on the front wheel axle and opposite to said web portion and which is disposed to be turned with said crank member, and a linking end which is distal to the front wheel axle and which is connected to said proximate end.

2. The shock absorbing device as claimed in claim 1, wherein said distal end of said lever is telescopically fitted to said lower end of said support leg, said resisting member including a coiled spring interposed between said distal end and said lower end.

3. The shock absorbing device as claimed in claim 2, wherein said first coupler has an end connected to said intermediate portion proximate to said upper end of said support leg.

4. The shock absorbing device as claimed in claim 1, wherein said resisting member includes a telescopic portion having a loaded end and a support end opposite to each other, and a coiled spring disposed in said teloscopic portion to bias said loaded end away from said support end, said loaded and support ends being connected respectively to said intermediate portion and said first coupler.

5. The shock absorbing device as claimed in claim 1, wherein said support leg is formed as a two-pronged fork.

6. A shock absorbing device adapted for use in a bicycle to reduce shock transmitted to a handlebar of the bicycle, the bicycle including a first brake cable, a front wheel axle defining a rotating axis, a front hub mounted on the front wheel axle to rotate about the rotating axis, a first friction brake member mounted to rotate with the front hub, and including an outer circumferential wall surface surrounding the rotating axis, and a stem disposed on and extending from the handlebar downwards to terminate at a first coupling end which is swiveled about a swiveling axis, wherein the shock is transmitted along a route which extends radially from the front wheel axle and rearwardly and upwardly to the swiveling axis of the stem to the handlebar, said shock absorving device comprising:

a support leg including an upper end adapted to be swiveled with the first coupling end of the stem about the swiveling axis and to be disposed distal to the handlebar, and an intermediate portion extending from said upper end downwards and forwardly and terminating at a lower end which is adapted to be disposed above the front wheel axle;

a lever including a proximate end adapted to be anchored relative to the front wheel axle, and a distal end fitted to said lower end of said support leg such that said intermediate portion is movable towards said proximate end when the stem is abruptly pressed by the combined inertial momenta of the mass of a rider and the mass of the bicycle as a result of a braking action, or when the shock is transmitted upwards via the front wheel axle as a result of unevenness of a road surface being traversed by the bicycle;

a crank member including a first journal end adapted to be journalled on the front wheel axle, and a web portion extending from said first journal end radically relative to the rotating axis and terminating at a second coupling end which is disposed to couple with said proximate end;

a resisting member disposed to bias said intermediate portion to move away from said proximate end, thereby providing a damping action to the shock;

a second friction brake member disposed on and movable relative to said web portion in an axial direction parallel to the rotating axis and between a braked position, where said second friction brake member, in response to an actuation of the front brake cable, in moved to abut against the first friction brake member so as to generate a frictional force to retard running of the front hub, while taking up the inertial momentum of the front hub to push said web portion as well as said second coupling end to turn so as to move a corresponding one of said proximate end and said intermediate portion away from the other of said intermediate portion and said proximate end, therby counteracting the relative movement of said intermediate portion towards said proximate end stemming from the braking action, and an unbraked position, where said second friction brake member is moved outwardly and in the axial direction to disengage the first friction brake member;

said resisting member including a telescopic portion having a loaded end and a support end opposite to each other, and a coiled spring disposed in said telescopic portion to bias said loaded end away from said support end, said loaded end being connected to said imtermediate portion, said support end being adapted to be connected to the front wheel axle; and a coupler having a journal end which is adapted to be journalled on the front wheel axle, and a linking end which is connected to said intermediate portion proximate to said lower end.

* * * * *